March 30, 1943.                F. M. LUND                2,315,066
                             ENLARGING EASEL
                          Filed Aug. 4, 1940           2 Sheets-Sheet 1
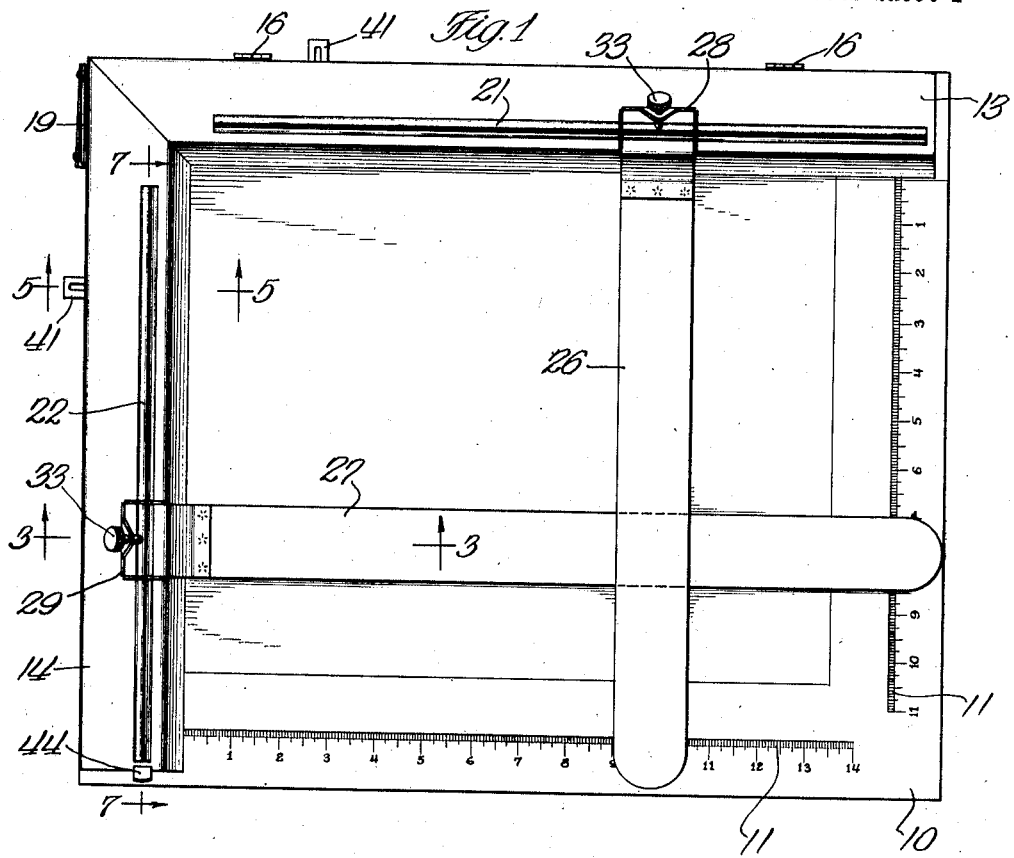
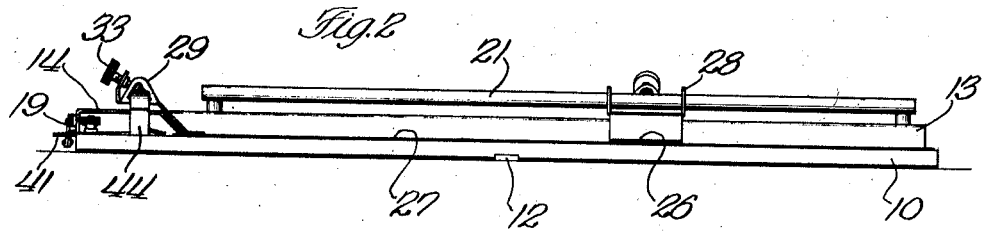
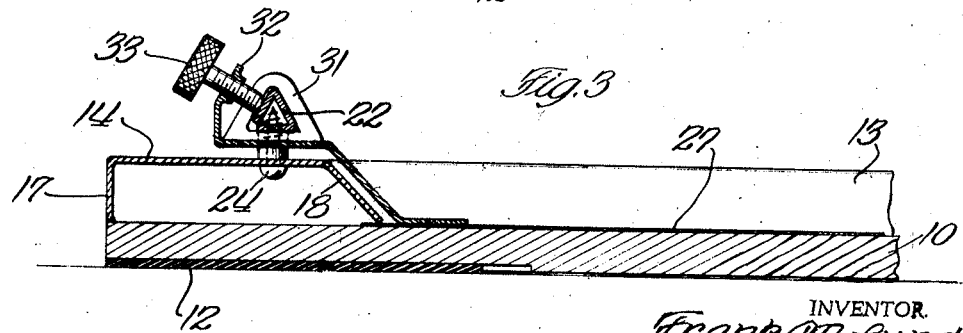
INVENTOR.
Frank M. Lund
BY McLaughlin & Wallenstein
ATTORNEYS

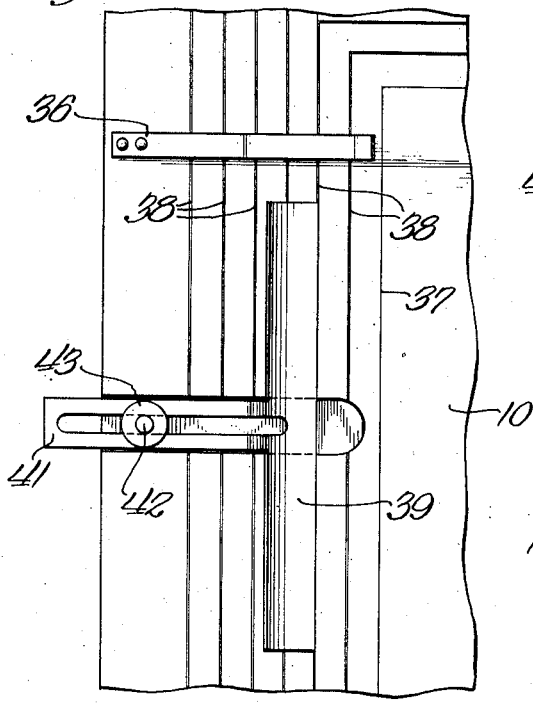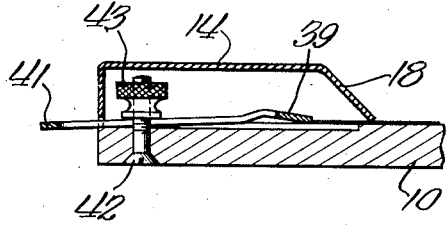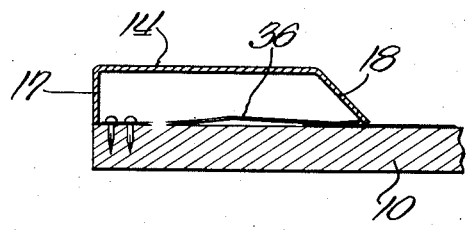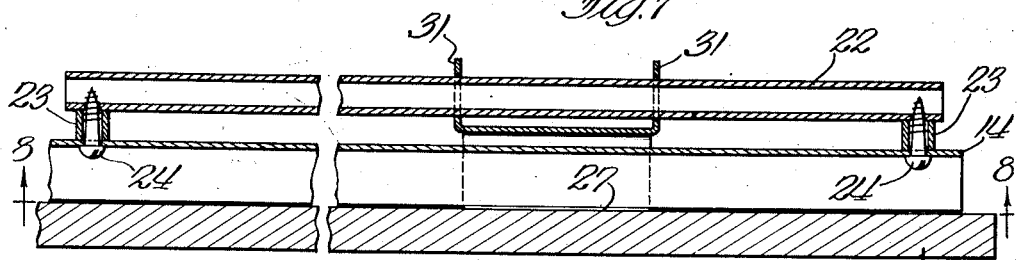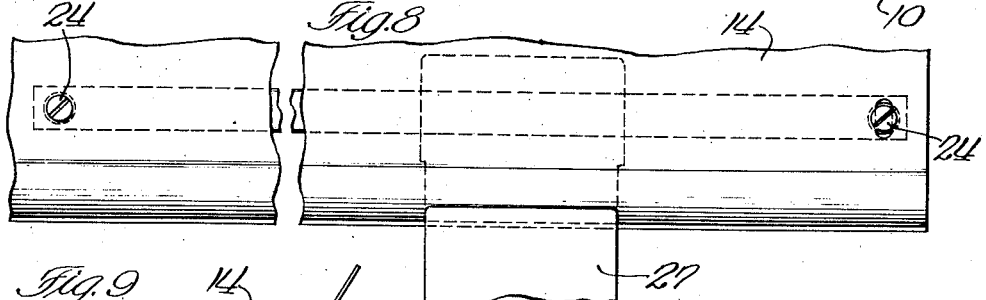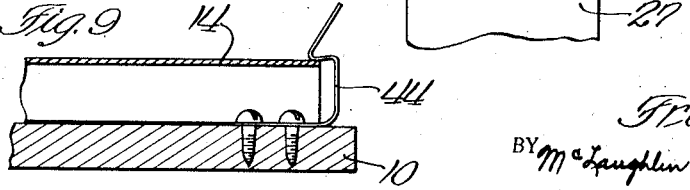

Patented Mar. 30, 1943

2,315,066

UNITED STATES PATENT OFFICE 2,315,066

ENLARGING EASEL

Frank M. Lund, Chicago, Ill., assignor of fifty per cent to Harvey M. Pushker, Chicago, Ill.

Application August 4, 1940, Serial No. 351,407

8 Claims. (Cl. 88—24)

My invention relates to so-called enlarging easels used for supporting photographic paper in a flat position during the making of an enlargement and masking, where required, the edges thereof.

In producing enlargements of relatively small photographic films, a common practice is to mount the film between the source of light and an enlarging lens which causes the light rays passing through the film to diverge and produce a larger image than that shown on the film. Equipment for performing this operation is known as an enlarger. The conventional method is to direct the image produced by the enlarger downwardly, and adjustments are provided to control the size of the image produced and to focus it sharply at the desired point. The photographic paper is supported in a horizontal position at this point and, when exposed for a suitable length of time, the photographic paper is treated with developing and fixing solutions to produce a completed print. While the paper may merely be laid upon a table or other flat surface, such as the wooden base usually provided on enlargers, it is convenient to provide some holding mechanism to assure that the paper will be held flat, that its position will be unchanged, and that it will be properly orientated with respect to the image focused upon it. Devices used for this purpose, usually called "enlarging easels," have, in the past, not been fully satisfactory. While those skilled in the art of making enlargements appreciate some of the disadvantages associated with easels of the prior art, it may be pointed out that among the principal objections found is that easels, which were capable of adjustment to various sizes and various conditions desired by amateur and professional photographers, were relatively cumbersome to operate and required considerable time for proper adjustment, with the result that, when a relatively large number of prints were to be produced. even if of the same size, the time involved in the process was inordinately extended. Another disadvantage frequently present in easels of the prior art is that the masking bands or strips, if supported in such a way as to be relatively freely adjustable, would not line up at true right angles to each other, so that the print and margins thereof would be irregular and non-uniform. Further disadvantages lay in the length of time required to introduce the paper, in the means for holding the paper prior to supporting it with the masking bands or strips, in the time required to properly adjust the margin, and in the fact that the board as a whole would frequently have to be readjusted as to position after the initial adjustment had been made.

The principal object of my present invention is the provision of an improved enlarging easel.

Another object is to overcome the principal disadvantages found in easels of the prior art, such as the disadvantages identified hereinabove.

A still further object is the provision of an improved, adjustable enlarging easel, so constructed and arranged, however, that it may be used to advantage as a piece of production equipment on which relatively large numbers of prints may be produced in a given length of time where desired.

Other specific objects and features of the invention will be apparent from a consideration of the following detailed description taken with the accompanying drawings, wherein, Figure 1 is a plan view of a photographic easel embodying the principles of my invention.

Figure 2 is an end view looking from the side of the easel appearing at the lower portion of Figure 1.

Figure 3 is an enlarged fragmentary sectional view taken on the line 3—3 of Figure 1 looking in the direction of the arrows.

Figure 4 is an enlarged plan view showing a portion of the base member below the marginal frame and illustrating a paper holding feature and margin controlling feature.

Figure 5 is an enlarged fragmentary sectional view taken on the line 5—5 of Figure 1 showing in section the margin controlling feature referred to in connection with Figure 4.

Figure 6 is a section similar to Figure 5 but taken at a point to show the paper holding member.

Figure 7 is an enlarged fragmentary sectional view taken on the line 7—7 of Figure 1 looking in the direction of the arrows.

Figure 8 is a fragmentary bottom plan section taken on the line 8—8 of Figure 7 and looking in the direction of the arrows, and Figure 9 is an enlarged fragmentary sectional view showing the clip means for securing in position the marginal frame and associated parts thereof.

Referring now to the drawings—

The easel comprises a base member 10 formed of suitable material such as laminated wood, plastic material, synthetic fibrous material or any suitable material which can be produced with a smooth plane surface and will resist warping during usual periods of use. The base member is made with rectangular side edges and preferably is provided with a pair of scales 11 at right angles to each other. The underside of the base member is provided with a plurality of friction members 12, suitably sponge rubber strips set in narrow grooves near the edges of the base member. Thus, when the easel is set in position on a table or other base associated with an enlarging mechanism, it can be certain that it will retain this position during normal use of the same incidental to inserting and removing photographic paper.

A marginal frame is provided comprising the parts 13 and 14 secured together in any suitable manner. This marginal frame is hinged at 16 to the upper edge of the base member so that the entire marginal frame and parts carried by it can be bodily swung upwardly of the base member. The marginal frame is suitably formed of sheet material or like material, having a cross section, as shown in the several figures, with a straight edge 17 which rests against the upper surface of the base member and an angular portion 18 which clears the base member sufficiently to just permit paper or the like to lie between its lower edge and the upper surface of the base member. Holding means 19 of suitable type are provided for holding the marginal frame in raised position. The holding means is so constructed and arranged that it may easily be tripped to permit the marginal frame to be lowered onto the base member.

Secured to the members 13 and 14 of the marginal frame are guide members or rails 21 and 22, preferably non-circular in cross section and shown in the drawings as being triangular in cross section, a form which I have found to be of very great advantage. The guide members are secured by providing tubular spacers 23 (see Figure 7) and fastening screws 24 extending upwardly through the marginal frame, tubular spacers and into the lower edge of the guide members.

Masking panels 26 and 27 are provided with brackets 28 and 29, respectively, for adjustable attachment to the guide members 21 and 22. They comprise preferably formed members as shown in Figure 3 with side members or ears 31 apertured to receive the guide members, and a portion 32 threaded to receive fastening means in the form of a screw 33. The construction and arrangement is such that the openings in the guide members are triangular to correspond with the shape of the guide members but loose so that when the screw 33 is loosened the panels freely move along the guide members; the construction further provides, however, that when the screw 33 is tightened the masking panels are brought in to true parallelism with one side of the marginal frame and at true right angles to each other and to the portion of the marginal frame to which they are secured. It will be noted, also, that in each instance a portion of the masking panel extends beyond the position of its attachment to its holding bracket so as to extend under the marginal frame and hold the masking panel against possible rotational movement about the guide member.

At suitable positions beneath the marginal frame I provide spring paper holding clips 36. These extend to a point almost to the extreme outside portion of the marginal frame so that even though an extremely small margin is provided on the photographic print, it may be held in position while the marginal frame, including the masking panels, is in raised position.

Looking at Figure 4, the numeral 37 indicates a line corresponding to the extreme position at which light from an enlarging apparatus will strike the paper when the marginal frame is lowered. Running back from the line 37 is a series of guide lines 38, each a uniform distance from the other, such as ¼ inch. These lines indicate the margin which is being provided on the paper during printing. As a further guide, however, I provide a guide abutment 39 carried by a slotted member 41 running in a groove on the portion of the member underneath the marginal frame. The screw 42 extends through the slot and a thumb nut 43 can be tightened to hold the guide abutment 39 in set position.

At the lower edge of the marginal frame, I provide a spring clip 44 as a spring latch. The spring clip 44 is secured as shown to the base member and is shaped so that the marginal frame can merely be lowered and the clip will spring out of the way and engage over the top edge of the frame. To raise the frame, however, it is necessary to engage the spring clip with the finger or thumb to release it.

My invention simplifies the production of enlargements as the manner of its use will clearly show. The upper surface of the base member is preferably white but may be any color which will facilitate its use in the intended manner. The scales show the exact position of the inner edges of the masking panels from the oppositely positioned edges of the marginal frame members. Thus, in Figure 1, one masking panel is shown at nine inches and the other masking panel at seven inches. The size of the print, therefore, will be nine inches by seven inches. The margin is determined by the size of the paper and the position at which the guide 39 is set. There is, of course, a guide provided at each edge, but for simplicity, only one is shown in detail in the drawings. If a total margin of ½ inch is required, then the guide members are set for ½ inch and the paper is cut one inch larger than the print which is to be made. The paper will, therefore, extend ½ inch under the members comprising the marginal frame and ½ inch under the masking panels. The adjustments having been made and the paper selected, the frame is raised, the paper is engaged under the clips 36 against the guides, and the frame is lowered. The easel is adjusted to position with the enlarger and the enlarger is adjusted to produce a picture of the size wanted in the proper focus. The members 12 prevent the slipping of the easel so that successive prints are then readily made without making any further adjustments in the easel. Should a print of a different size be desired, all necessary adjustments for the new print are very readily made.

What I claim as new and desire to protect by Letters Patent of the United States is:

1. In a photographic easel, a generally rectangular base member, a marginal frame lying against the base member and pivoted along one edge thereof, non-circular guide rails at right angles to each other carried by and above the marginal frame, straight edge masking panels lying flat against the said base, each being unsupported at one end and having at another end a bracket with a pair of side members provided with openings through which one of said guide rails passes, and screw fastening means threaded in each bracket and engageable against the associated guide rail, whereby to wedge those portions of said side members contiguous to the said openings against the guide rail for securing the associated masking panel in set position, the parts being so constructed and arranged that said guide rails are relatively loose in said openings in the side members of said bracket, but when said fastening means are tightened the masking panels will be held rigidly at right angles to each other and at right angles to the guide rails to which they are secured.

2. A photographic easel as defined in claim 1, wherein a portion of the masking panel extends beyond the point at which it is secured to a bracket and is shaped to extend under the marginal frame, whereby when the screw fastening means is loose, a masking panel may be moved readily along its frame, but is prevented from rotating about its guide rail.

3. A photographic easel as defined in claim 1, wherein said guide rails are triangular in cross section and supported on uprights near ends thereof, and wherein the openings in the side members of the masking panel brackets are triangular but loosely engaging around the guide rails.

4. A photographic easel as defined in claim 1, wherein said guide rails are triangular in cross section and supported on uprights near ends thereof, wherein the openings in the side members of the masking panel brackets are triangular but loosely engaging around the guide rails, and wherein said screw fastening means is threaded in the bracket and engageable against a side of the triangular guide rail, whereby an edge of the guide rail is wedged into one angular portion of each of the said openings in the masking panel bracket.

5. A photographic easel as defined in claim 1, wherein said marginal frame comprises two portions at right angles to each other, and each carries a guide rail supporting a masking panel, whereby a print is framed on two sides by said frame and at two sides by the masking panels, said easel including means, carried by the base and beneath said marginal frame, for determining the margin of paper extending beneath the frame and masking panels.

6. A photographic easel as defined in claim 1, including a spring clip positioned beneath the marginal frame, for holding paper in set position when the marginal frame and masking panels are raised from the said base, said spring clip extending substantially to that edge of the said marginal frame contiguous to the light exposable portion of the paper, and having an edge projecting up loosely whereby to engage paper as it is mounted on the easel.

7. A photographic easel comprising a rectangular paper supporting base, an L-shaped frame hinged along one margin to the base whereby to lie flat along two side edges of the base as a masking frame but leaving two side edges free for showing indicia such as linear scales which may be applied directly to the base, two guide rails of angular cross section, one secured by vertically disposed spacers above each leg of the marginal frame and lying parallel to the contiguous edges of the base, two masking bands each having a bracket with openings corresponding to the cross sectional shape of the guide rails through which the guide rails extend relatively loosely, whereby said masking bands may be moved readily, and screw fastening means threaded in the brackets and engageable against a side of the contiguous rail, whereby the rail may be wedged against one side of the opening in the bracket and place the masking panels at exact right angles to each other.

8. A photographic easel comprising a rectangular paper supporting base, an L-shaped frame hinged along one margin to the base whereby to lie flat along two side edges of the base as a masking frame but leaving two side edges free for showing indicia such as linear scales which may be applied directly to the base, two guide rails of angular cross section, one secured by vertically disposed spacers above each leg of the marginal frame and lying parallel to the contiguous edges of the base, two masking bands each having a bracket with openings corresponding to the cross sectional shape of the guide rails through which the guide rails extend relatively loosely, whereby said masking bands may be moved readily, and screw fastening means threaded in the brackets and engageable against a side of the contiguous rail, whereby the rail may be wedged against one side of the opening in the bracket and place the masking panels at exact right angles to each other, said L-shaped frame and two panels masking the four sides of a print, and said base carrying under the L-shaped frame stop means for determining the margin of paper under the L-shaped frame, and spring clip means for holding said paper against said stop means when the L-shaped frame and masking panels are released from the paper.

FRANK M. LUND.